(12) United States Patent
Purohit et al.

(10) Patent No.: US 10,429,177 B2
(45) Date of Patent: Oct. 1, 2019

(54) BLOCKED SENSOR DETECTION AND NOTIFICATION

(71) Applicant: Google Inc., Mountain View, CA (US)

(72) Inventors: Aveek Ravishekhar Purohit, Mountain View, CA (US); Michael Dixon, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 616 days.

(21) Appl. No.: 14/585,481

(22) Filed: Dec. 30, 2014

(65) Prior Publication Data

US 2016/0187127 A1    Jun. 30, 2016

(51) Int. Cl.
  G01B 21/00    (2006.01)
  G08B 29/04    (2006.01)
  G08B 29/16    (2006.01)

(52) U.S. Cl.
  CPC .......... *G01B 21/00* (2013.01); *G08B 29/04* (2013.01); *G08B 29/046* (2013.01); *G08B 29/16* (2013.01)

(58) Field of Classification Search
  CPC ...... G01B 21/00; G01B 29/04; G01B 29/046; G01B 29/16; G08B 29/046; G08B 29/16
  USPC ........................................................ 702/150
  See application file for complete search history.

(56) References Cited

U.S. PATENT DOCUMENTS

| | | | |
|---|---|---|---|
| 4,959,713 A * | 9/1990 | Morotomi | G08B 25/085 340/4.4 |
| 5,285,136 A * | 2/1994 | Duhame | F16P 3/12 318/266 |
| 5,427,444 A | 6/1995 | Griesemer | |
| 5,565,844 A | 10/1996 | Bedrosian | |
| 7,423,530 B2 | 9/2008 | Babich et al. | |
| 8,378,820 B2 | 2/2013 | Micko | |
| 8,451,135 B2 | 5/2013 | Carl | |
| 2006/0181401 A1 * | 8/2006 | Martin | G08B 15/002 340/506 |

(Continued)

FOREIGN PATENT DOCUMENTS

| | | |
|---|---|---|
| CA | 2300463 A1 | 9/2001 |
| EP | 0481934 A1 | 4/1992 |
| WO | 2006107203 A1 | 10/2006 |

OTHER PUBLICATIONS

PCT/US2015/067506, International Search Report and Written Opinion issued in PCT/US2015/067506 dated May 24, 2016, May 24, 2016, p. 16.

(Continued)

*Primary Examiner* — Sujoy K Kundu
*Assistant Examiner* — Lynda Dinh
(74) *Attorney, Agent, or Firm* — Morris & Kamlay LLP

(57) ABSTRACT

Systems and techniques are provided for blocked sensor detection and notification. A signal may be received from a sensor. The sensor may be determined to be producing anomalous output based on checking the signal from the sensor against a signal from a second sensor on the same sensor device as the sensor, checking the signal from the sensor against signals from sensors on additional sensor devices, and checking the signal from the sensor against a slow temporal model for the sensor. In response to the determination that the sensor is producing anomalous output, a notification may be generated indicating the sensor is producing anomalous output, and a confidence level in the sensor may be degraded.

22 Claims, 7 Drawing Sheets

(56) References Cited

U.S. PATENT DOCUMENTS

| | | | |
|---|---|---|---|
| 2008/0084294 A1* | 4/2008 | Zhiying | G08B 21/12 340/539.22 |
| 2012/0026890 A1* | 2/2012 | Banka | H04L 67/125 370/242 |
| 2012/0026898 A1* | 2/2012 | Sen | H04L 43/04 370/252 |

OTHER PUBLICATIONS

Invitation to Pay Add'l Fees and Partial Search Report issued in PCT/US2015/067506 dated Mar. 15, 2016.
IPRP dated Jul. 13, 2017 as received in Application No. PCT/US2015/067506.

* cited by examiner

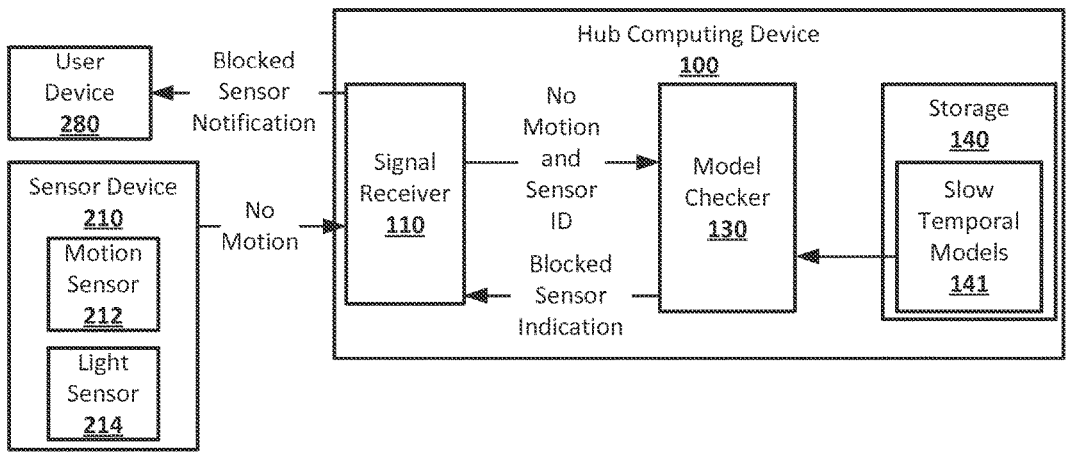
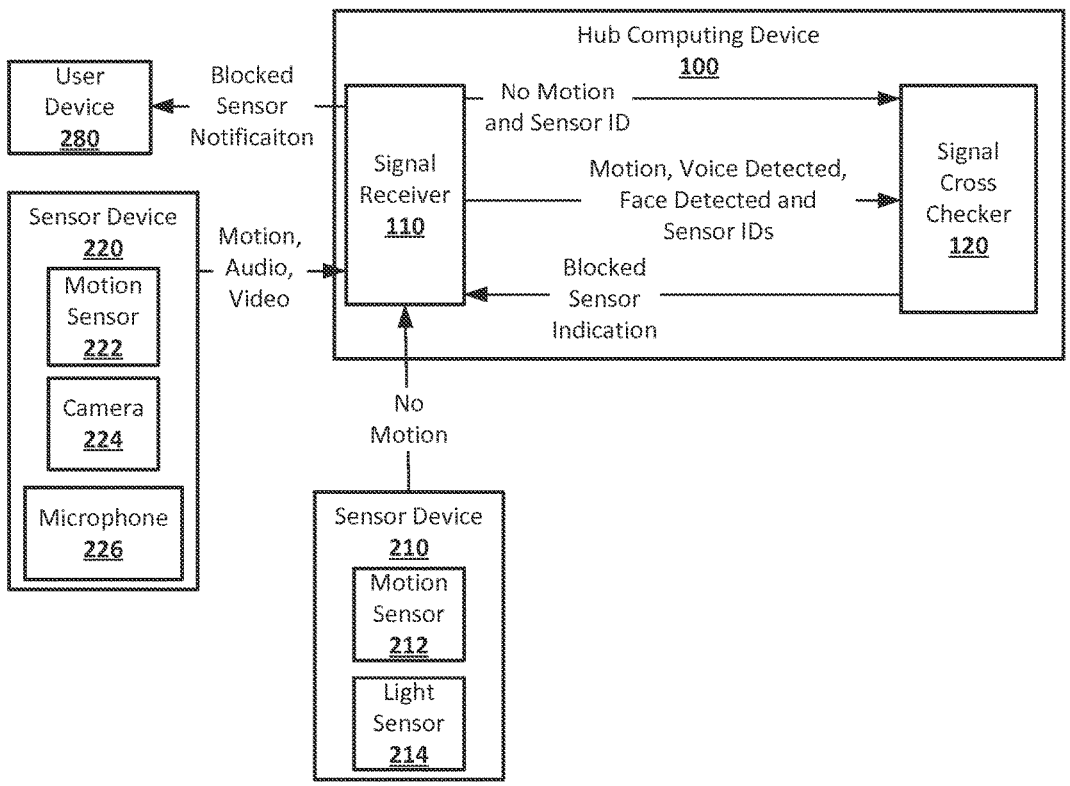

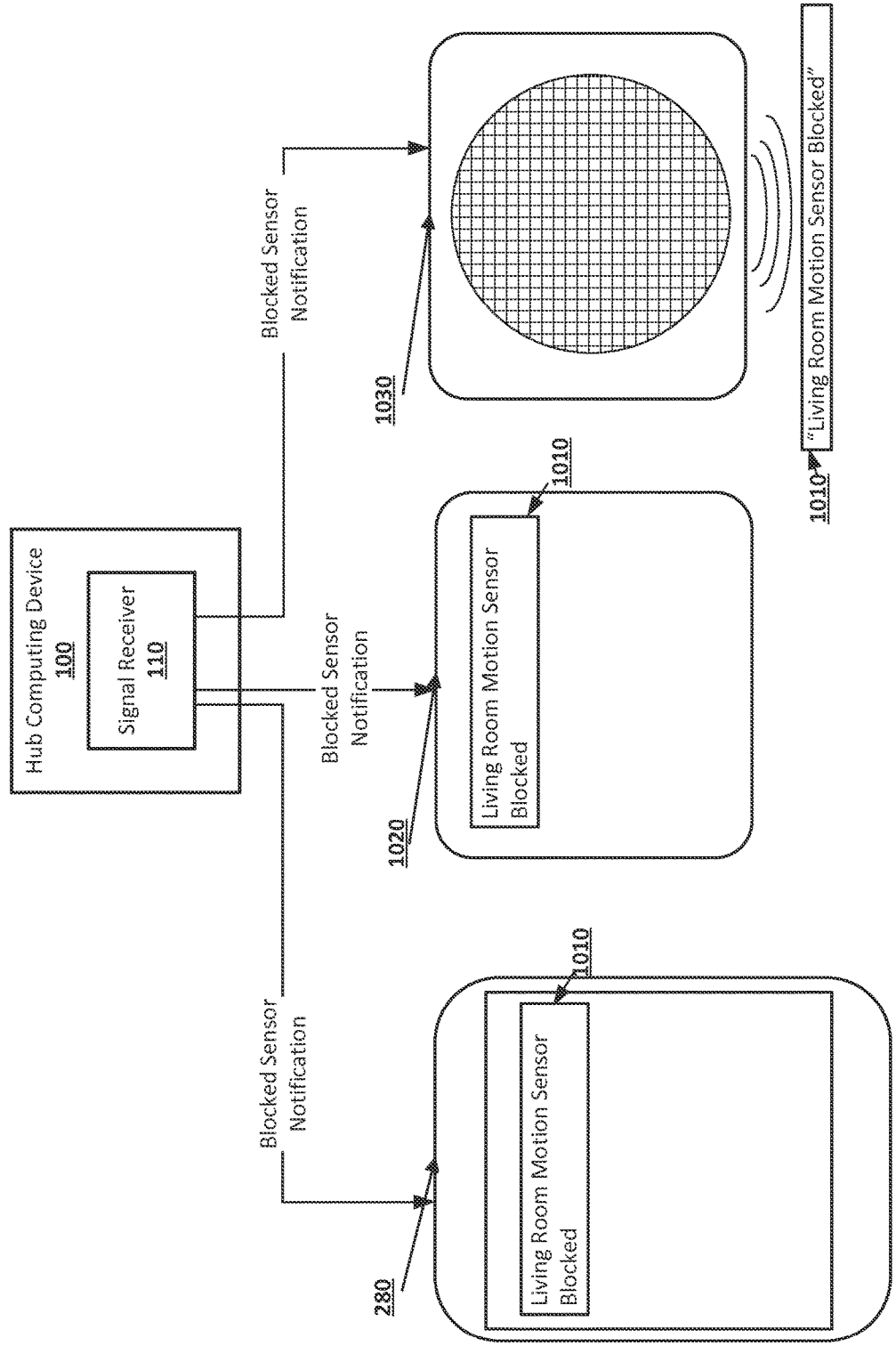

BLOCKED SENSOR DETECTION AND NOTIFICATION

BACKGROUND

A smart home environment may include sensors that monitor various aspects of an environment such as a home. Motion sensors may monitor rooms in the home for motion, and may be able to generate an alert when motion is detected in a room in which no motion is expected. Other sensors, such as cameras, microphones, and light sensors may also be able to generate alarms when they detect anomalous occurrences, such as the voices or lights being turned on in a room, which is supposed to be empty.

Some sensors of the smart home environment may become blocked. Objects, such as purses, bags, or boxes, may be placed in front of sensors, limiting the sensors ability to monitor the environment. For example, a purse placed in front of a motion sensor may prevent the motion sensor from detecting motion in a room. A blocked sensor may not be triggered when activity that would otherwise trigger the sensor occurs, and may not generate alerts when necessary. For example, a blocked motion sensor may not generate an alert when there is motion in the room monitored by the sensor even when there should not be anybody moving in the room.

BRIEF SUMMARY

According to an embodiment of the disclosed subject matter, a signal may be received from a sensor. The sensor may be determined to be producing anomalous output based on checking the signal from the sensor against a signal from a second sensor on the same sensor device as the sensor, checking the signal from the sensor against signals from sensors on additional sensor devices, and checking the signal from the sensor against a slow temporal model for the sensor. In response to the determination that the sensor is producing anomalous output, a notification may be generated indicating the sensor is producing anomalous output, and a confidence level in the sensor may be degraded.

The signal from the sensor may be checked against a signal from a second sensor on the same sensor device as the sensor further comprises. The signal from the second sensor on the same sensor device as the sensor may be received. It may be determined that the signal from the sensor is inconsistent with the signal from the second sensor. An indication that the sensor is producing anomalous output may be generated.

The signal from the sensor may be checked against signals from sensors on additional sensor devices. The signals from the sensors on the additional sensor devices may be received. It may be determined that the signal from the sensor is inconsistent with one of the signals from the sensors. It may be determined that the signals from the sensors are consistent with each other. An indication that the sensor is producing anomalous output may be generated.

The signal from the sensor may be checked against a slow temporal model for the sensor. The slow temporal model for the sensor may be received. It may be determined that the signal from the sensor is inconsistent with a signal that the slow temporal model indicates is expected from the sensor in the situation in which the signal from the sensor was generated. An indication that the sensor is producing anomalous output may be generated.

The slow temporal model for the sensor may include signals from the sensor over a period of time. The slow temporal model may be one of a statistical, probabilistic, or machine learning based model for the signals from the sensor. It may be determined that the signal from the sensor is inconsistent with a signal that the slow temporal model indicates is expected over a threshold period of time before generating the indication that the sensor is producing anomalous output. It may be determined that there are no extenuating circumstances causing the signal from the sensor to be inconsistent with the signal that the slow temporal model indicates is expected, before the indication that the sensor is producing anomalous output may be generated. An extenuating circumstance may include a security system including the sensor being set to an away mode or a vacation mode.

The sensor may be a motion sensor. It may be determined that the signal from the sensor is inconsistent with one of the signals from the sensors. It may be determined that the signal from the motion sensor indicates no motion is detected in an environment monitored by the motion sensor. It may be determined that one of the signals indicates the presence of a moving person within the environment. The environment may be a room in a structure. The sensor may be a motion sensor, a passive infrared sensor, a low power motion sensor, a light sensor, a camera, a microphone, or an entryway sensor. The notification may be a blocked sensor notification indicating that the sensor is obstructed. The notification may be sent to a computing device associated with a user of a smart home environment, a display within the smart home environment, and a speaker system within the smart home environment.

According to an embodiment of the disclosed subject matter, a means for receiving a signal from a sensor, a means for determining that the sensor is producing anomalous output based on a means for checking the signal from the sensor against a signal from a second sensor on the same sensor device as the sensor, a means for checking the signal from the sensor against signals from sensors on additional sensor devices, and a means for checking the signal from the sensor against a slow temporal model for the sensor, a means for generating a notification indicating the sensor is producing anomalous output, a means for degrading a confidence level the sensor, a means for receiving the signal from the second sensor on the same sensor device as the sensor, a means for determining that the signal from the sensor is inconsistent with the signal from the second sensor, a means for generating an indication that the sensor is producing anomalous output, a means for receiving the signals from the sensors on the additional sensor devices, a means for determining that the signal from the sensor is inconsistent with one of the signals from the sensors, a means for determining that the signals from the sensors are consistent with each other, a means for generating an indication that the sensor is producing anomalous output, a means for receiving the slow temporal model for the sensor, a means for determining that the signal from the sensor is inconsistent with a signal that the slow temporal model indicates is expected from the sensor in the situation in which the signal from the sensor was generated, a means for generating an indication that the sensor is producing anomalous output, a means for determining that the signal from the sensor is inconsistent with a signal that the slow temporal model indicates is expected over a threshold period of time before generating the indication that the sensor is producing anomalous output, a means for determining that there are no extenuating circumstances causing the signal from the sensor to be inconsistent with the signal that the slow temporal model indicates is expected, before generating the indication that the sensor is producing anomalous output, a means for determining that the signal from the motion sensor indicates no motion is detected in an environment monitored by the motion sensor, and a means for determining that one of the signals indicates the presence of a moving person within the environment, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows an example arrangement suitable for blocked sensor detection and notification according to an implementation of the disclosed subject matter.

FIG. 4 shows an example arrangement suitable for blocked sensor detection and notification rides according to an implementation of the disclosed subject matter.

FIG. 10 shows an example arrangement suitable for blocked sensor detection and notification according to an implementation of the disclosed subject matter.

DETAILED DESCRIPTION

Figure 1:
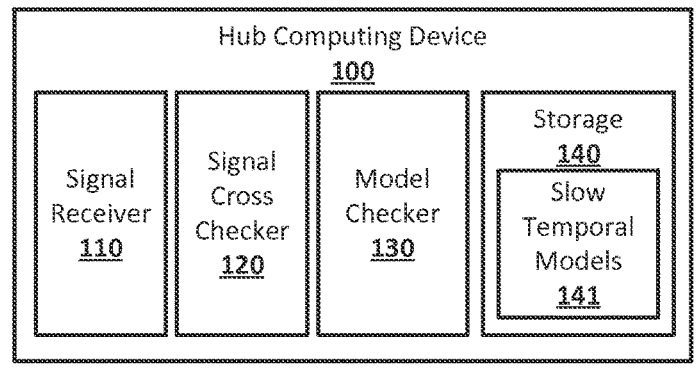
FIG. 1 shows an example system suitable for blocked sensor detection and notification according to an implementation of the disclosed subject matter.

According to embodiments disclosed herein, blocked sensor detection and notification may allow a smart home environment to determine when a sensor has been blocked or is otherwise producing anomalous output. This may allow for a user of the security system to be notified of a blocked sensor, for example so that the user may unblock it. It may also cause confidence in the blocked sensor to be degraded when the smart home environment uses signals from various sensors through the environment to make determinations about the status of the environment, such as the number of occupants in the environment. The environment may be, for example, a home, office, apartment, condo, or other structure, and may include a combination of enclosed and open spaces. Signals may be received from a sensor in the smart home environment. The sensor may be, for example, a low power motion sensor, such as a passive infrared sensor used for motion detection. The signals from the sensor may be compared to a slow temporal model that has been created for the sensor. The slow temporal model may include a model of the signals received from the sensor over a long period of time, for example, a number of days, weeks, months, or years. The signal received from the sensor may be checked against the slow temporal model. If the signal is determined to be inconsistent with the stow temporal model, the sensor may be determined to be blocked. For example, if no motion is detected by the sensor in a situation where motion is normally detected, such as in the kitchen on a weekday morning, the sensor may be blocked, or may be producing anomalous output for other reasons, such as a malfunction. A notification may be generated to a user of the security system to indicate that the sensor is blocked, and confidence in the sensor may also be degraded.

The signal from the sensor may also be checked for consistency against signals from another sensor that is on the same sensor device. For example, a sensor device may include a low-power motion sensor and a light sensor. The low-power motion sensor may generate a signal indicating no motion is detected, while the light sensor may at the same time generate a signal indicating a change in lighting, indicating that a light switch has been flipped. These signals may be inconsistent, as the flipping of a light switch should be accompanied by detecting the motion of the person responsible for flipping the switch. This may result in the determination that the low power motion sensor is blocked or producing anomalous output.

The signal from the sensor may also be checked for consistency against signals from other sensors, on other sensor devices, within the environment. For example, a signal from a low power motion sensor may be cross-checked against signals from a camera and microphone on a different sensor device within the same room. If the signals are inconsistent, the low power motion sensor may be determined to be blocked. For example, the low power motion sensor may generate a signal indicating no motion is detected, while the microphone on the other sensor device in the room may pick up voices, and the camera may recognize faces in the room. Because the presence of voices and faces in the room may be inconsistent with the signal indicating no motion, the low power motion sensor may be determined to be blocked or producing anomalous output.

The smart home environment may include a hub computing device, which may be any suitable computing device for managing the smart home environment, including a security system of the smart home environment and automation system including other functions beyond security. The hub computing device may be a controller for a smart home environment. For example, the hub computing device may be or include a smart thermostat. The hub computing device also may be another device within the smart home environment, or may be a separate computing device dedicated to managing the smart home environment. The hub computing device may be connected, through any suitable wired and wireless connections, to a number of sensors distributed throughout an environment. Some of the sensors may, for example, be motions sensors, including passive infrared sensors used for motion detection, tight detectors, cameras, microphones, entryway sensors, as well as Bluetooth, WiFi, or other wireless devices used as sensors to detect the presence of devices such as smartphones, tablets, laptops, or fobs. Sensors may be distributed individually, or may be combined with other sensors in sensor devices. For example, a sensor device may include a tow power motion sensor and a light sensor, or a microphone and a camera, or any other combination of available sensors.

Signals from the sensors distributed throughout the environment may be sent to the hub computing device. The hub computing device may use the signals received from the sensors to make determinations about the environment, including managing the security system and automation functions of the smart home environment. For example, the hub computing device may use signals received from the sensors to determine how many occupants are in a home, based on motion sensing, voice and face recognition through cameras, and detection of computing devices, such as smartphone or tablets, or fobs associated with residents of the home or guests in the home.

The hub computing device may check signals received from a sensor against a slow temporal model for the sensor. The slow temporal model for a sensor may be based on the value of the sensor signals over time, and may include patterns in the signal values. The slow temporal model for a sensor may be a statistical, probabilistic, or machine learning based model. For example, a passive infrared sensor may be used as low powered motion sensor. The passive infrared sensor may detect heat, and may detect motion based on the movement of a heat source. The low power motion sensor may monitor the living room of a house, in which it may detect movement every weekday morning and evening. This pattern may be included in the slow temporal model for the low power motion sensor. If, on a weekday morning, the low power motion sensor does not detect any movement in the living room, the hub computing device may determine the signals from the low power motion sensor are inconsistent with the slow temporal model for the sensor. The hub computing device may determine, based on this inconsistency, that the low power motion sensor has been blocked, for example, by an object such as a purse or laptop bag, or is otherwise producing anomalous output.

The hub computing device may make the determination that a sensor is blocked or otherwise producing an anomalous signal on the first occurrence of an inconsistency between the signals from the sensor and the slow temporal model for the sensor, or after some threshold number of inconsistencies. The hub computing device may also determine whether there are extenuating circumstances that may explain the inconsistency. For example, if the security system of the smart home environment has been set to an "away" or "vacation" mode, this may indicate that the home is supposed to be unoccupied, and that the low power motion sensor should not detect any movement even when the slow temporal model indicates that movement should be detected. The hub computing device may then ignore signals from the low power motion sensor that are inconsistent with the slow temporal model for the sensor instead of determining that the low power motion sensor is blocked, until the mode of the security system is changed to a "stay" or "home" mode.

Multiple sensors may be part of the same sensor device. For example, a single sensor device may include a low power motion sensor and light sensor, which may detect the light level within an environment. The sensor device may send signals from all sensors on the sensor device to the hub computing device. The signals may be checked against each other for consistency, to determine if one of the sensors on the sensor device is blocked. For example, a low power motion detector on the sensor device may produce signals indicating that no movement has been detected in a room in which the sensor device is located. The light sensor may produce a signal indicating that the light level in the room has increased, going from a dark room to a room illuminated by artificial light sources. The hub computing device may determine that the signal from the low power motion detector, indicating no motion in the room, is inconsistent with the signal from the light detector, indicating a large change in the light level in the room, as such a change in light level may be indicative of a light switch in the room being turned on by a person. The hub computing device may then determine that low power motion sensor is blocked or otherwise producing an anomalous signal.

The hub computing device may make the determination that a sensor is blocked or otherwise producing an anomalous signal on the first occurrence of an inconsistency between the signals from the sensor and another sensor on the same sensor device, or after some threshold number of inconsistencies. The hub computing device may also determine whether there are extenuating circumstances that may explain the inconsistency. For example, the light switch for a room may be located outside of the room, or the lights may be connected to the smart home environment and controllable through the hub computing device, allowing them to be switched on based on a schedule or timer or user interaction even when no one is moving within the room the lights illuminate.

The smart home environment may include multiple sensors, and multiple sensor devices, placed throughout the environment and connected, either wired or wirelessly, to the hub computing device. For example, one room may include a sensor device with a light sensor and a low power motion sensor, and another sensor device with a camera and a microphone. The hub computing device may receive signals from all of the sensors on the all of the sensor devices within the environment. For example, the hub computing device may receive a signal from the low power motion sensor indicating whether or not motion is detected in the room, and may also receive video signals from the camera and audio signals from the microphone, which may be used, for example, for voice and facial recognition.

The hub computing device may cross-check signals from different sensors on different sensor devices against each other to determine if a sensor is blocked or other producing anomalous output. For example, the low power motion sensor produces a signal indicating no motion is detected in a room. The microphone of the other sensor device in the room may produce an audio signal including voices, which the hub computing device may recognize as belonging to occupants of the home. The hub computing device may determine that the signal from the low power motion sensor is inconsistent with the signal from the microphone, and that the low power motion sensor may be blocked or producing an anomalous signal. Multiple signals may be cross-checked. For example, the audio signal from the microphone may also be cross-checked with the video signal from the camera on the same sensor device. If the video signal does not corroborate the audio signal, for example, no recognizable faces are found in the video signal, or no persons can be determined to be in view of the camera based on the video signal, the hub computing device may determine that the signal from microphone is anomalous, rather than the signal from the low power motion sensor.

The slow temporal model for sensors may also be used to cross-check sensor signals to determine if a sensor is blocked or producing anomalous output. For example, the slow temporal model for a motion sensor may indicate that motion is detected in a room monitored by the low power motion sensor every evening on weekdays. The room may include other sensors, either as part of the same or different sensor devices. For example, the room may include another low power motion sensor, and a sensor device with a camera and a microphone. The slow temporal model for the other low power motion sensor may indicate that motion is detected the room every evening on weekdays, and the slow temporal models from the camera and microphone may indicate facial and voice recognition of a particular occupant of the home in the room every evening on weekdays, corresponding to the motion detected by the motion sensors. On a weekday evening, one of the low power motion sensors may produce a signal indicating that no motion is detected in the room, inconsistent with the sensor's slow temporal model. If the other low power motion sensor, the camera, and the microphone produce signals consistent with their slow temporal models for a weekday evening, the hub computing device may determine that the first low power motion sensor is blocked or otherwise producing anomalous output. If the other low power motion sensor, the camera, and the microphone produce signals that are also not consistent with their slow temporal models, the hub computing device may determine that the behavior of the occupant has changed on the particular evening.

The slow temporal models for the sensors in a smart home environment may be stored may be stored in any storage accessible to the hub computing device. The slow temporal models may include any suitable amount of signal data generated by the various sensors, stored in any suitable format for comparison and pattern detection. For example, the slow temporal models may be machine learning based models, and whether or not a signal generated by a sensor is consistent with a slow temporal model for the sensor may be determined based on confidence levels output by a machine learning system. Slow temporal models may also be statistical, probabilistic, or parameter based. For example, a slow temporal model for a low powered motion sensor may be a time-series of signals from the low motion sensor, with each point in the series indicating whether or not motion was detected.

When the hub computing device has determined that a sensor is blocked or is otherwise producing anomalous output, the hub computing device may notify a user of the smart home environment. For example, the hub computing device may send a message, via email, SMS, MMS, or application notification, to a computing device associated with a user of the smart home environment, such as a smartphone, tablet, laptop, or wearable computing device. The hub computing device may display a message, for example, on a display of the hub computing device or other display that is part of the smart home environment, such as a television or display on a smart thermostat.

The hub computing device may use signals from the various sensors in the smart home environment to make determinations about the state of the environment. For example, the hub computing device may determine an occupancy model of a home based on signals from sensors throughout the home. When the hub computing device has determined that a sensor is blocked or otherwise producing anomalous output, the hub computing device may degrade the confidence level of the sensor. Signals from a sensor with a degraded confidence level may have less of an impact on determinations made by the hub computing device about the environment, such as, for example, the number and location of occupants in the environment. The confidence level in the sensor may be degraded over time. For example, every instance of inconsistency between signals from a sensor and the slow temporal model for the sensor may result in a small decrease in the confidence level for the sensor, so that a number of detected inconsistencies may be required before the confidence level in the sensor is severely degraded. Likewise, the confidence level of a sensor may be restored when the signals from the sensor show consistency with the slow temporal model over a number of instances.

Sensors in the smart home environment may send indications to the hub computing device actively or passively. For example, a low power motion sensor may actively produce an output signal when motion is and is not detected, with the signal including the indication of whether or not motion was detected. Alternatively, the low power motion sensor may only produce active output when motion is detected, with the output being the signal that motion was detected, and may otherwise produce no output when not motion is detected, with the lack of output acting a signal that motion was not detected. This may allow the tow power motion sensor to operate using less power. The hub computing device may interpret the lack of active output from a low power motion sensor as a signal indicating that no motion has been detected by the sensor. Anomalous output for a low power motion sensor may include not sending any output to the hub computing device or sending output including a signal indicating that there is no motion detected when there is motion in the room, or sending a signal indicating motion in the room when there is no motion.

FIG. 1 shows an example system suitable for blocked sensor detection and notification according to an implementation of the disclosed subject matter. A hub computing device 100 may include a signal receiver 110, a signal cross-checker 120, a model checker 130, and storage 140. The hub computing device 100 may be any suitable device, such as, for example, a computer 20 as described in FIG. 14, for implementing the signal receiver 110, the signal cross-checker 120, the model checker 130, and storage 140. The hub computing device 100 may be, for example, a controller 73 as described in FIG. 12. The hub computing device 100 may be a single computing device, or may include multiple connected computing devices, and may be, for example, a smart thermostat, other smart sensor, smartphone, tablet, laptop, desktop, smart television, smart watch, or other computing device that may be able to act as a hub for a smart home environment, which may include a security system and automation functions. The smart home environment may be controlled from the hub computing device 100. The hub computing device 100 may also include a display. The signal receiver 110 may be any suitable combination of hardware or software for receiving signals generated by sensors that may be part of the smart home environment and may be connected to the hub computing device 100. The signal cross-checker 120 may be any suitable combination of hardware and software for cross-checking signals from various signals against each other for consistency. The model checker 130 may be any suitable hardware and software for comparing signals received from sensors with a slow temporal model 141 for the sensor stored in the storage 140. The slow temporal models 141 may be stored the storage 140 in any suitable manner.

The hub computing device 100 may be any suitable computing device for acting as the hub of a smart home environment. For example, the hub computing device 100 may be a smart thermostat, which may be connected to various sensors throughout an environment as well as to various systems within the environment, such as HVAC systems, or it may be another device within the smart home environment. The hub computing device 100 may include any suitable hardware and software interfaces through which a user may interact with the hub computing device 100. For example, the hub computing device 100 may include a touchscreen display, or may include web-based or app based interface that can be accessed using another computing device, such as a smartphone, tablet, or laptop. The hub computing device 100 may be located within the same environment as the smart home environment it controls, or may be located offsite. An onsite hub computing device 100 may use computation resources from other computing devices throughout the environment or connected remotely, such as, for example, as part of a cloud computing platform. The hub computing device 100 may be used to arm a security system of the smart home environment, using, for example, an interface on the hub computing device 100. The security system may be interacted with by a user in any suitable matter, including through a touch interface or voice interface, and through entry of a PIN, password, or pressing of an "arm" button on the hub computing device 100.

The hub computing device 100 may include a signal receiver 110. The signal receiver 110 may be any suitable combination of hardware and software for receiving signals from sensors connected to the hub computing device 100. For example, the signal receiver 110 may receive signals from any sensors distributed throughout a smart home environment, either individually or as part of sensor devices. The signal receiver 110 may receive any suitable signals from the sensors, including, for example, audio and video signals, signals indicating light levels, signals indicating detection or non-detection of motion, signals whether entryways are open, closed, opening, closing, or experiencing any other form of displacement, signals indicating the current climate conditions within and outside of the environment, smoke and carbon monoxide detection signals, and signals indicating the presence or absence of occupants in the environment based on Bluetooth or WiFi signals and connections from electronic devices associated with occupants or fobs carried by occupants. The signal receiver 110 may pass received signals to other components of the hub computing device 100 for further processing, such as, for example, detection of tripped motion and entryway sensors and use in automation and security determinations, and for storage. The signal receiver 110 may also be able to receive, or to associate with a received signal, an identification for the sensor from which the signal was received. This may allow the signal receiver 110 to distinguish which signals are being received from which sensors throughout the smart home environment. For example, a low power motion sensor may send a sensor identification to the signal receiver 110 when actively outputting a signal indicating motion has been detected. The low power motion sensor may not actively output a signal when no motion is detected, so the signal receiver may be able to determine that the lack of active output from the low power motion sensor is a signal indicating no motion was detected, and may associate this signal with the identity of the low power motion sensor from which no output was received.

The hub computing device 100 may include a signal cross-checker 120. The signal cross-checker 120 may be any suitable combination of hardware and software for cross-checking and correlating signals from various sensors. The signal cross-checker 120 may check signals received by the signal checker 110 for consistency with each other. The signals may be from different sensors on the same sensor device, or from different sensors on different sensor devices. For example, the signal cross-checker 120 may check a signal received from a low powered motion sensor on a sensor device against a signal received from a light sensor on the same sensor device to determine if the signals are consistent or if one of the sensors is producing anomalous output. The signal-cross checker 120 may check a signal received from a low powered motion sensor on first sensor device against signals received from sensors, such as a camera and a microphone, on a second sensor device to determine if the signals are consistent or if one of the sensors is producing anomalous output.

The hub computing device 100 may include a model checker 130. The model checker 130 may be any suitable combination of hardware and software for checking signals from various sensors against the slow temporal models 141. The slow temporal models 141 may include slow temporal models for the various sensors in the smart home environment. The model checker 130 may check a signal received by the signal receiver 110 against the slow temporal model 141 for the sensor that generated the signal, to determine if the signal is consistent with the slow temporal model 141. The model checker 130 may also cross-check signals from various sensors against the slow temporal models 141, in conjunction with the signal cross-checker 120 checking the signals against each other. The model checker 130 may determine if only one of the various signals are inconsistent with the slow temporal models 141 for their sensor, which may indicate anomalous output from the inconsistent sensor, or if all of the signals are inconsistent, which may indicate a change from the normal pattern observed in the part of the environment monitored by the various sensors.

The storage 140 may be any suitable storage hardware connected to the hub computing device 100, and may store the slow temporal model 14 in any suitable manner. For example, the storage 140 may be a component of the hub computing device, such as a flash memory module or solid state disk, or may be connected to the hub computing device 100 through any suitable wired or wireless connection. It may be a local storage, i.e., within the environment within which the hub computing device operates, or it may be partially or entirely operated by a remote service, such as a cloud-based monitoring service as described in further detail herein. Any number of slow temporal models 141 may be stored, each of which may be a representation of signals received from a particular sensor over time. A slow temporal model 141 for a sensor may be stored in any suitable format, including, for example, as a set of parameters or conditional clauses, or a time-series of recorded signals, or as weights for a suitable machine learning system. The slow temporal model 141 for a sensor may be based on, for example, signals received from the sensor by the signal receiver 110 over any suitable period of time, such as, for example, days, weeks, months, or years.

Figure 2:
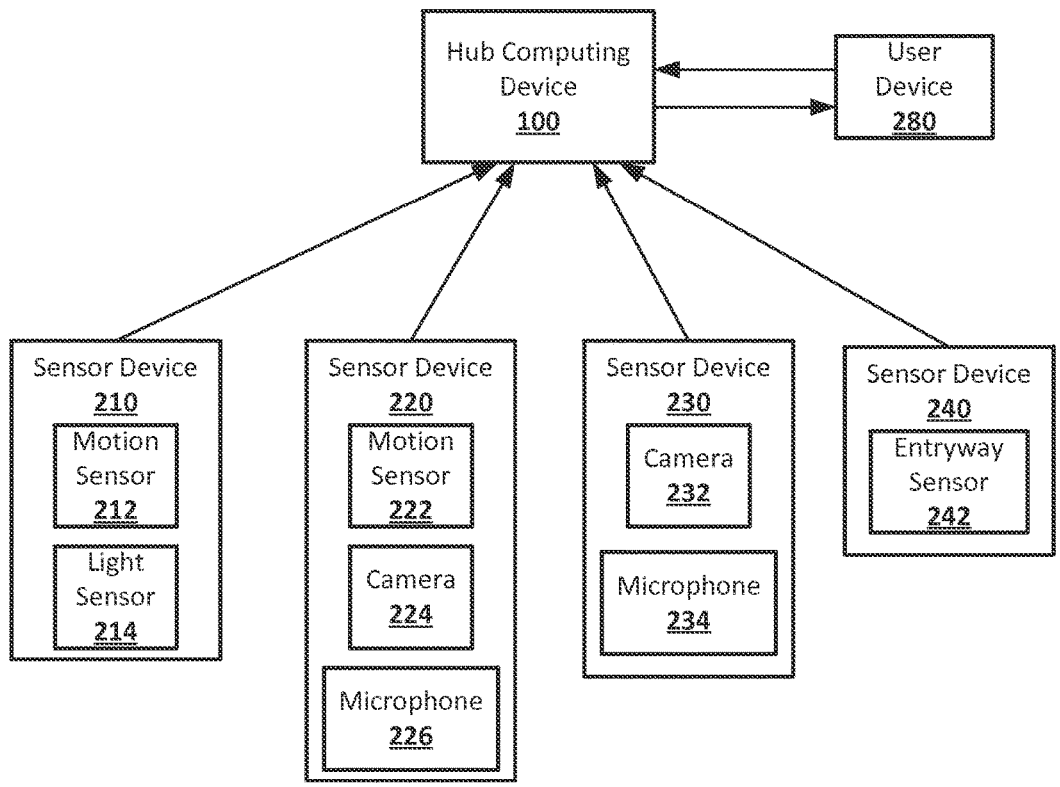
FIG. 2 shows an example arrangement suitable for blocked sensor detection and notification according to an implementation of the disclosed subject matter.

FIG. 2 shows an example arrangement suitable for blocked sensor detection and notification according to an implementation of the disclosed subject matter. The hub computing device 100 may be the hub, or controller, for a smart home environment. Various sensor devices throughout the environment may be connected to the hub computing device 100. Each sensor device may have any suitable assortment of sensors. For example, the sensor devices 210, 220, 230, and 240 may be connected to the hub computing device 100. The sensor device 210 may include a motion sensor 212 and a light sensor 214. The sensor device 220 may include a motion sensor 222, a camera 224, and a microphone 226. The sensor device 230 may include a camera 232 and a microphone 234. The sensor device 240 may include an entry sensor 242. The motions sensors 212 and 222 may be any suitable sensors for detecting motion in an environment, such as, for example, a low power motion sensor using a passive infrared sensor to detect the motion of heat. The light sensor 214 may be any suitable sensor for detecting light levels within an environment. The entryway sensor 242 may be any suitable type of sensor, such as contact sensors, including magnetic contact sensors, and tilt sensors, for detecting when an entryway is open. For example, the entryway sensor 242 may be a sensor attached to a bedroom window in a home, and may detect when the bedroom window has been moved in any way, for example moved towards an open or closed position, and may also measure vibrations or impacts experienced by the window.

The sensors of the sensors devices 210, 220, 230, and 240 may generate signals that may be received by the signal receiver of the hub computing device 100. The signals may be the product of active output the sensors, for example, a video or audio signal produced by the camera 224 or microphone 226, or may be the result of a sensor not generating any output, for example, a lack of output from the motion sensor 212 when no motion is detected.

The hub computing device 100 may also be connected, in any suitable manner, to a user computing device 280. The user computing device 280 may be any suitable computing device, such as, for example, a smartphone, tablet, laptop, or smartwatch or other wearable computing device, which a user may use to interface with the hub computing device 100 and control the security system. The hub computing device 100 may be able to send notifications, alerts or requests to the user computing device 280, either through a direct connection, such as LAN connection, or through a WAN connection such as the Internet. This may allow the user of the user computing device 280 to monitor and manage the smart home environment even when the user is not physically near the hub computing device 100. For example, when the signal cross-checker 120 determines that a sensor, such as the motion sensor 212, is blocked or otherwise producing anomalous output, the hub computing device 100 may send a notification, alert, or request for action to the user computing device 280. The user computing device 280 may be used by the user to respond to such a notification, alert, or request for action, for example, by providing an indication to the hub computing device 100 of an action to take in regards to the blocked or malfunctioning sensor.

FIG. 3 shows an example arrangement suitable for blocked sensor detection and notification according to an implementation of the disclosed subject matter. A signal indicating that no motion has been detected may be received by the signal receiver 110 from the motion sensor 212 of the sensor device 210. For example, the motion sensor 212 may output a signal indicating that no motion has been detected, or may not produce any output, which may be interpreted by the signal receiver 110 as a signal that no motion has been detected. The signal may include an identification for the motion sensor 212, or the signal receiver 110 may otherwise correlate the signal with the motion sensor 212.

The model checker 130 may receive the signal indicating no motion from the motion sensor 212 and the identification of the motion sensor 212 from the signal receiver 110. The model checker 130 may check the slow temporal model 141 for the motion sensor 212, based on the received identification for the motion sensor 212, to determine whether the signal is consistent with the slow temporal model 141. Consistency with the slow temporal model 141 may be checked in any suitable manner. For example, if the slow temporal model 141 for the motion sensor 212 is stored as weights for a machine learning system, the signal from the motion sensor 212 may be input into an appropriate machine learning system using the stored weights, which may result in the output of, for example, a confidence level that the signal is consistent with the slow temporal model 141.

The model checker 130 may determine that the signal indicating no motion from the motion sensor 212 is inconsistent with the slow temporal model 141 for the motion sensor 212. For example, it may be a 9:00 am on a weekday morning, and the slow temporal model 141 for the motion sensor 212 may indicate that motion should be detected at that time, as it has been on at 9:00 am on all previous weekday mornings. A signal from the motion sensor 212 indicating that no motion is detected may then be inconsistent with the slow temporal model 141. If there are no extenuating circumstances, for example, the smart home environment has been set to an "away" or "vacation" mode, the model checker 130 may determine that the motion sensor 212 is blocked or otherwise producing anomalous output. This determination may made after the first inconsistency is detected, or may require a number of consecutive inconsistencies, for example, to account for slight variations in the schedule of the occupant whose motion is normally detected at 9:00 am on weekdays. For example, the model checker 130 may not determine that the motion sensor 212 is blocked or other producing anomalous output until some time period, for example, 30 minutes, have passed, during which the motion sensor 212 produces a signal of no motion detected that is inconsistent with the slow temporal model 141 for the motion sensor 212.

The model checker 130 may generate a blocked sensor indication. The blocked sensor indication may indicate the motion sensor 212 is either blocked by an object or is otherwise malfunctioning or out of position, resulting in anomalous output. The blocked sensor indication may be sent to any suitable component of the hub computing device 100, such as the signal receiver 110. The signal receiver 110 may use the blocked sensor indication to degrade the confidence level for the motion sensor 212. The signal receiver 110 may also generate a notification of the blocked sensor, which may be sent to a user on the user computing device 280, may be displayed on a display in the smart home environment connected to the hub computing device 100 or part of the hub computing device 100, or may be audibly communicated to a user through a speaker that is a component of the smart home environment.

The notification of the blocked sensor may be sent to the user based on the detection of the user's presence or absence in the environment. For example, if the user is not detected within the environment, the notification may be sent to the user computing device 280, which may be, for example, a smartphone or wearable computing device associated with the user. If the user is detected within the environment, the notification may be displayed on the nearest screen to the user.

The notification may include an identification of the motion sensor 212, and a report indicating why the motion sensor 212 was determined to be blocked or otherwise producing anomalous output, so that the user may attempt to correct the issue by, for example, removing an object blocking the motion sensor 212, re-positioning the motion sensor 212, or replacing the motion sensor 212 if it is defective.

FIG. 4 shows an example arrangement suitable for blocked sensor detection and notification according to an implementation of the disclosed subject matter. A signal indicating that no motion has been detected may be received by the signal receiver 110 from the motion sensor 212 of the sensor device 210. The signal may include an identifier for the motion sensor 212, or the signal receiver 110 may otherwise correlate the signal with the motion sensor 212. The motion sensor 222, camera 224, and microphone 226 of the sensor device 220 may send signals including video from the camera 224, audio from the microphone 226, and an indication of motion detected from the motion sensor 222 to the signal receiver 110. The signals may include an identification of the motion sensor 222, the camera 224, and the microphone 226. The sensor device 220 may monitor the same area of the environment as the motion sensor 212. For example, sensor device 210 and the sensor device 220 may be placed in the same room of a home.

The signal receiver 110, or another suitable component of the hub computing device 100, may process the audio and video signals from the microphone 226 and the camera 224 in any suitable manner. For example, the voice and facial recognition may be performed on the audio and video signals. The video signals may also be processed to recognize the presence or motion of persons in the video.

The signal cross-checker 120 may check the signals from the motion sensors 212 and 222, the camera 224, and the microphone 226, against each other to determine if they are consistent. For example, since the sensor device 210 and the sensor device 220 are in the same room of a home, if the motion sensor 222 detects motion, the motion sensor 212 may also detect motion. 117 the audio signal from the microphone 226 includes a voice recognized as belonging to an occupant of the home, then it should be likely that the motion sensors 212 and 222 will also detect motion, unless the voice is originating from a different room. Similarly if the video signal from the camera 224 includes a face recognized as belonging to an occupant of the home, then the motion sensors 212 and 222 should detect motion of that occupant in the room.

The signal cross-checker 120 may determine that the signal indicating no motion from the motion sensor 212 is inconsistent with the signals from the motion sensor 222, the camera 224, and the microphone 226. For example, the motion sensor 212 may indicate that no motion is detected, and the audio and video signals from the camera 224 and the microphone 226 may include a voice and face recognized as belonging to an occupant of the home. This may indicate that the occupant is present in the room, and the motion sensor 212 has failed to pick up the movement of the occupant. The signal cross-checker 120 may determine that the motion sensor 212 is blocked or otherwise producing anomalous output.

The signal cross-checker 120 may check any suitable signal from any suitable sensor against any other suitable signals. For example, the signal cross-checker 120 may check signals from the entryway sensor 242 of the sensor device 240 and the camera 232 and microphone 234 against of the sensor device 230 against the signals from the motion sensor 212 if the sensor device 240 is positioned at a suitable entryway relative to the position of the motion sensor 212, and the sensor device 230 is positioned in the same area as the sensor device 210. For example, entryway sensor 242 may monitor a door to a room in which the sensor device 210 is positioned, and the sensor device 230 may be positioned in the room with the sensor device 210. The signal cross-checker 120 may receive a signal from the entryway sensor 242 indicating that the door to the room has been opened, audio and video signals from the microphone 234 and the camera 232 in which the voice and face of an occupant are recognized, and a signal from the motion sensor 212 that no motion has been detected. The signal cross-checker 120 may determine that these signals are inconsistent, as the motion sensor 212 should detect motion of the occupant who opened the door and is talking in the room. The signal cross-checker 120 may determine that the motion sensor 212 is blocked or otherwise producing anomalous output.

The signal cross-checker 120 may generate a blocked sensor indication. The blocked sensor indication may indicate the motion sensor 212 is either blocked by an object or is otherwise malfunctioning or out of position, resulting in anomalous output. The blocked sensor indication may be sent to any suitable component of the hub computing device 100, such as the signal receiver 110. The signal receiver 110 may use the blocked sensor indication to degrade the confidence level for the motion sensor 212. The signal receiver 110 may also generate a notification of the blocked sensor, which may be sent to a user on the user computing device 280, may be displayed on a display in the smart home environment connected to the hub computing device 100 or part of the hub computing device 100, or may be audibly communicated to a user through a speaker that is a component of the smart home environment.

Figure 5:
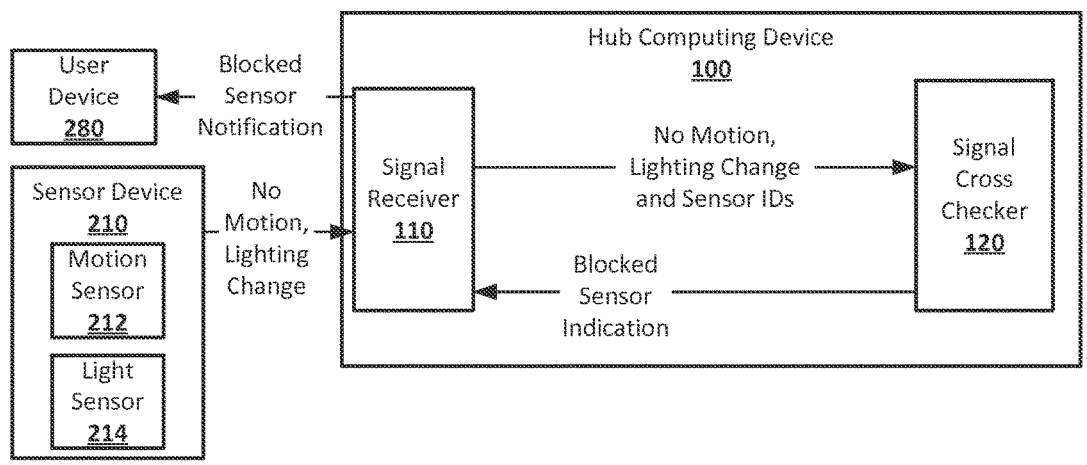
FIG. 5 shows an example arrangement suitable for blocked sensor detection and notification rides according to an implementation of the disclosed subject matter.

FIG. 5 shows an example arrangement suitable for blocked sensor detection and notification according to an implementation of the disclosed subject matter. A signal indicating that no motion has been detected may be received by the signal receiver 110 from the motion sensor 212 of the sensor device 210. The signal may include an identifier for the motion sensor 212, or the signal receiver 110 may otherwise correlate the signal with the motion sensor 212. The light sensor 214 of the sensor device may send a signal indicating a change in light level to the signal receiver 110, along with an identifier of the light sensor 214.

The signal cross-checker 120 may check the signals from the motion sensor 212 and the light sensor 214, against each other to determine if they are consistent. For example, the motion sensor 212 may indicate that no motion is detected, and the light sensor 214 may indicate that the light level in the room has changed, for example, in a manner consistent with a light switch in a room being turned on. The signals from the motion sensor 212 and the light sensor 214 on the sensor device 210 may be determined to be inconsistent. The signal cross-checker 120 may determine that the motion sensor 212 is blocked or otherwise producing anomalous output.

The signal cross-checker 120 may generate a blocked sensor indication. The blocked sensor indication may indicate the motion sensor 212 is either blocked by an object or is otherwise malfunctioning or out of position, resulting in anomalous output. The blocked sensor indication may be sent to any suitable component of the hub computing device 100, such as the signal receiver 110. The signal receiver 110 may use the blocked sensor indication to degrade the confidence level for the motion sensor 212. The signal receiver 110 may also generate a notification of the blocked sensor, which may be sent to a user on the user computing device 280, may be displayed on a display in the smart home environment connected to the hub computing device 100 or part of the hub computing device 100, or may be audibly communicated to a user through a speaker that is a component of the smart home environment.

The signal cross-checker 120 may also work in conjunction with the model checker 130. For example, if a signal from the motion sensor 212 is found to be inconsistent with a signal from light sensor 214 on the same sensor device 210, the signal cross-checker 120 may not be able to determine which of the motion sensor 212 and the light sensor 214 is producing the anomalous output. The model checker 130 may check the signals from the motion sensor 212 and the light sensor 214 against their slow temporal models 141. If one of the signals, for example, the signal from the motion sensor 212, is inconsistent with the slow temporal model 141 while the other signal, for example, the signal from the light sensor 214, is consistent with the slow temporal 141, the model checker 130 may determine that the sensor that generated signal that is inconsistent with the slow temporal model 141 is blocked or otherwise producing anomalous output.

Figure 6:
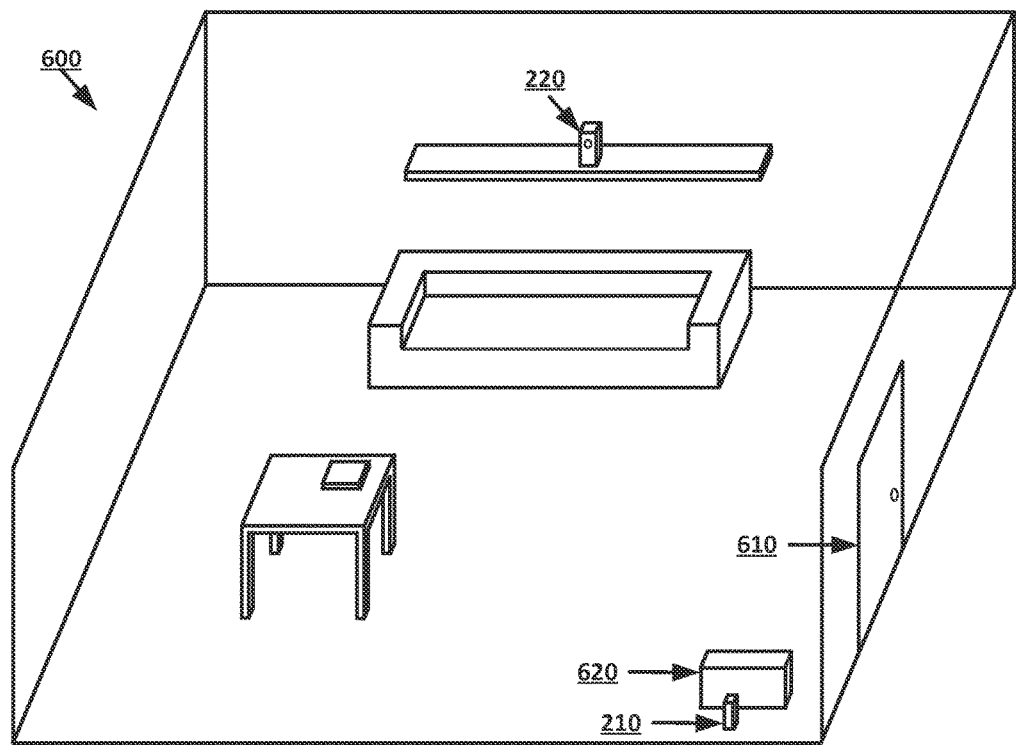
FIG. 6 shows an example environment suitable for blocked sensor detection and notification rides according to an implementation of the disclosed subject matter.

FIG. 6 shows an example environment suitable for blocked sensor detection and notification rides according to an implementation of the disclosed subject matter. The sensor device 210 and the sensor device 220 may be used to monitor the same room 600, which may be, for example, the living room of a home. The sensor drive 210 and the sensor device 220 may be positioned differently, for example, based on their included sensors. For example, the sensor device 220 may be positioned on a high shelf overlooking the room 600 to allow the camera 224 a better view of the entire room 600. The sensor device 210, including the motion sensor 212, may be positioned on the floor on the room 600, near an entryway 610, in order to allow the motion sensor 212 to better register when a person enters the room 600 through the entryway 610.

An obstruction 620 may be placed in front of the sensor device 210. The obstruction 620 may be, for example, a box, bag, backpack, purse, laptop case, or any other item that may obstruct the motion sensor 212. The motion sensor 212 may be a passive infrared sensor, and may be unable to distinguish between the obstruction 620 and a lack of motion in the room 600. Signals from the motion sensor 212 to the signal receiver 110 may indicate no motion in the room 600 for as long as the obstruction 620 is in front of the sensor device 210. To detect that the motion sensor 212 is blocked by the obstruction 620, the signals from the motion sensor 212 may cross-checked against the signals from the sensor device 220, which may not be blocked, checked against the slow temporal model 141 for the motion sensor 212, which may indicate that the motion sensor 212 is not detecting motion in situations where motion is usually detected, and checked against signals from the tight sensor 214, which may operate properly despite the obstruction 620. Once the motion sensor 212 is determined to be blocked, a notification may be sent to a user in any suitable manner so that the user may check the motion sensor 212, and remove the obstruction 620.

Figure 7:
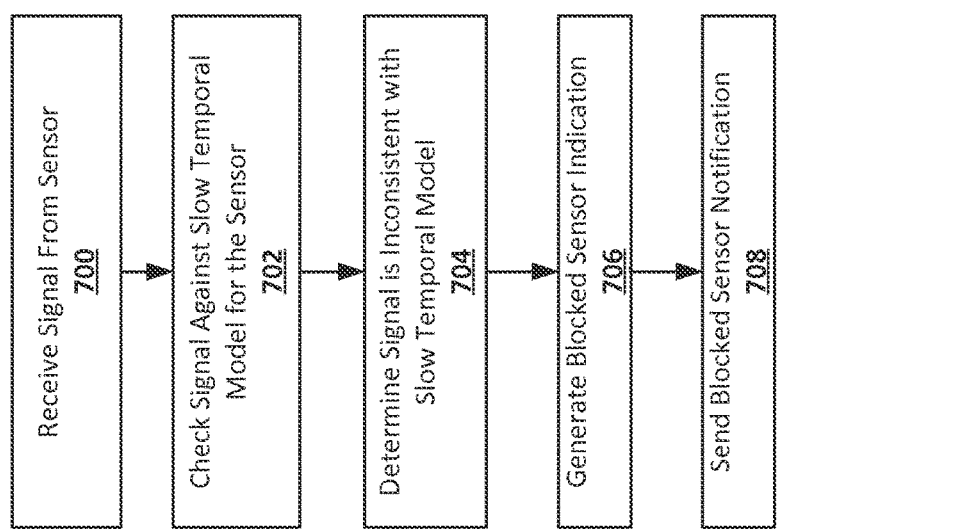
FIG. 7 shows an example of a process suitable for blocked sensor detection and notification according to an implementation of the disclosed subject matter.

FIG. 7 shows an example of a process suitable for blocked sensor detection and notification according to an implementation of the disclosed subject matter. At 700, a signal may be received from a sensor. For example, the signal receiver 110 of the hub computing device 100 may receive a signal from the motion sensor 212 of the sensor device 210, which may be part of a smart home environment. The signal may be actively output by the motion sensor 212, or may be interpreted from a lack out active output from the motion sensor 212. The signal may indicate, for example, that the motion sensor 212 has not detected any motion. The signal may also include an identification of the motion sensor 212, either explicitly, or based on a correlation by the signal receiver 110.

At 702, the signal may be checked against a slow temporal model for the sensor. For example, the model checker 130 may check the signal received from the motion sensor 212 against the slow temporal model 141 for the motion sensor 212. The stow temporal model 141 may be, for example, a statistical, probabilistic, or machine learning based model of signals received from the motion sensor 212 over a period of time. The identification of the motion sensor 212 may be used to identify the correct slow temporal model 141.

At 704, it may be determined that the signal is inconsistent with the slow temporal mode. For example, it may be a weekday morning, and the signal received from the motion sensor 212 may indicate that no motion has been detected. The slow temporal model 141 may indicate that in similar situations in the past, for example, on previous weekday mornings, the motion sensor 212 detected motion. The signal from the motion sensor 212 indicating no motion may be inconsistent with the slow temporal model 141. The determination of inconsistency may be made in any suitable manner. For example, the signal may be determined to be inconsistent if it is inconsistent with the slow temporal model 1411 once, or may only be determined to be inconsistent if it is inconsistent with the slow temporal model 141 over some period of time, or over several different periods of time. For example, the slow temporal model 141 may indicate that motion is normally detected on weekday mornings from 9:00 am to 9:30 am. If the signal from the motion sensor 212 indicates no motion from 9:00 am to 9:15 am, but then indicates motion from 9:25 am to 9:40 am, the signal may not be determined to inconsistent with the slow temporal model 141. The signal may also be determined to be inconsistent with the slow temporal model 141 over several different periods of time. For example, the motion sensor 212 may generate a signal indicating no motion detected over the course of several weekday mornings, when the slow temporal model 1411 indicates that motion should be detected, before the signal is determined to be inconsistent with the slow temporal model 141.

At 706, a blocked sensor indication may be generated. For example, the model checker 130 may have determined that the signal from the motion sensor 212 is inconsistent with the slow temporal model 141. This may indicate that the motion sensor 212 is blocked or otherwise producing anomalous output. A blocked sensor indication may be generated by the model checker 130 and sent to the signal receiver 110. The signal receiver 110 may degrade the confidence level of the motion sensor 212 based on the blocked sensor indication.

At 708, a blocked sensor notification may be sent. For example, the signal receiver 110, or other suitable component the hub computing device 100 may send a notification indicating that the motion sensor 212 is blocked to a user of the smart home environment. The notification may be sent to the user computing device 280, displayed on a display of the hub computing device 100 or other display connected to the smart home environment, transmitted through a speaker of the smart home environment, or sent in any other suitable manner. The notification may identify the motion sensor 212, so that the user may attempt to unblock or otherwise fix or replace the motion sensor 212.

Figure 8:
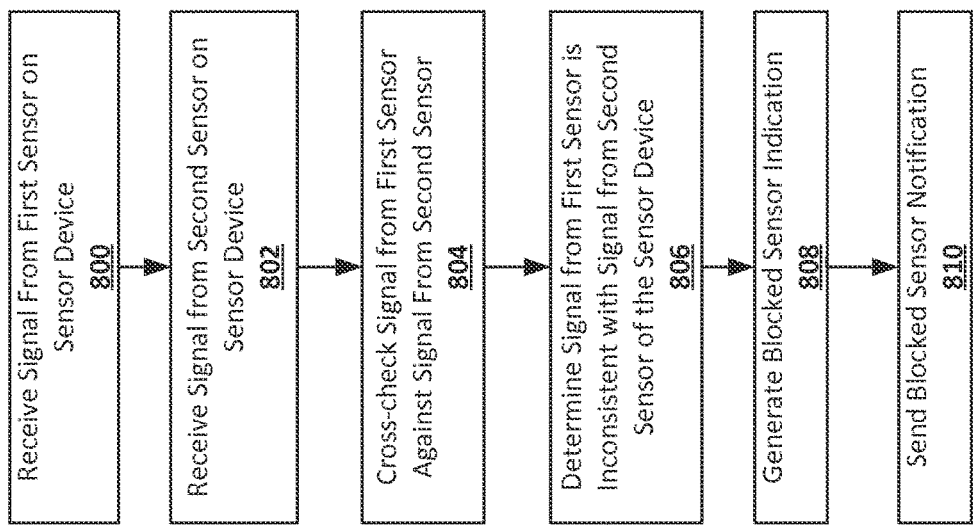
FIG. 8 shows an example of a process suitable for blocked sensor detection and notification according to an implementation of the disclosed subject matter.

FIG. 8 shows an example of a process suitable for blocked sensor detection and notification according to an implementation of the disclosed subject matter. At 800, a signal may be received from a first sensor on a sensor device. For example, the signal receiver 110 of the hub computing device 100 may receive a signal from the motion sensor 212 of the sensor device 210, which may be part of a smart home environment. The signal may be actively output by the motion sensor 212, or may be interpreted from a lack out active output from the motion sensor 212. The signal may indicate, for example, that the motion sensor 212 has not detected any motion. The signal may also include an identification of the motion sensor 212, either explicitly, or based on a correlation by the signal receiver 110.

At 802, a signal may be received from a second sensor on the sensor device. For example, the signal receiver 110 of the hub computing device 100 may receive a signal from the light sensor 214 of the sensor device 210.

At 804, the signal from the first sensor may be cross-checked against the signal from the second sensor. For example, the signal cross-checker 120 may check the signal received from the motion sensor 212 against the signal received from the light sensor 214.

At 806, it may be determined that the signal from the first sensor is inconsistent with the signal from the second sensor of the sensor device. For example, the signal received from the motion sensor 212 may indicate that no motion has been detected. The signal received from the light sensor 214 may indicate that the light level in the room with the sensor device 210 has changed, for example, going from dark to light from artificial light sources. This may indicative of a light switch in the room being switched on. The signal from the motion sensor 212 may be determined to be inconsistent with the signal from the light sensor 214, as a person may need to be in the room in order to turn the lights on, in which case the motion sensor 212 should have registered the motion of that person.

At 808, a blocked sensor indication may be generated. For example, the model checker 130 may have determined that the signal from the motion sensor 212 is inconsistent with the signal from the light sensor 214. This may indicate that the motion sensor 212 is blocked or otherwise producing anomalous output. A blocked sensor indication may be generated by the model checker 130 and sent to the signal receiver 110. The signal receiver 110 may degrade the confidence level of the motion sensor 212 based on the blocked sensor indication.

At 810, a blocked sensor notification may be sent. For example, the signal receiver 110, or other suitable component the hub computing device 100 may send a notification indicating that the motion sensor 212 is blocked to a user of the smart home environment. The notification may be sent to the user computing device 280, displayed on a display of the hub computing device 100 or other display connected to the smart home environment, transmitted through a speaker of the smart home environment, or sent in any other suitable manner. The notification may identify the motion sensor 212, so that the user may attempt to unblock or otherwise fix or replace the motion sensor 212.

Figure 9:
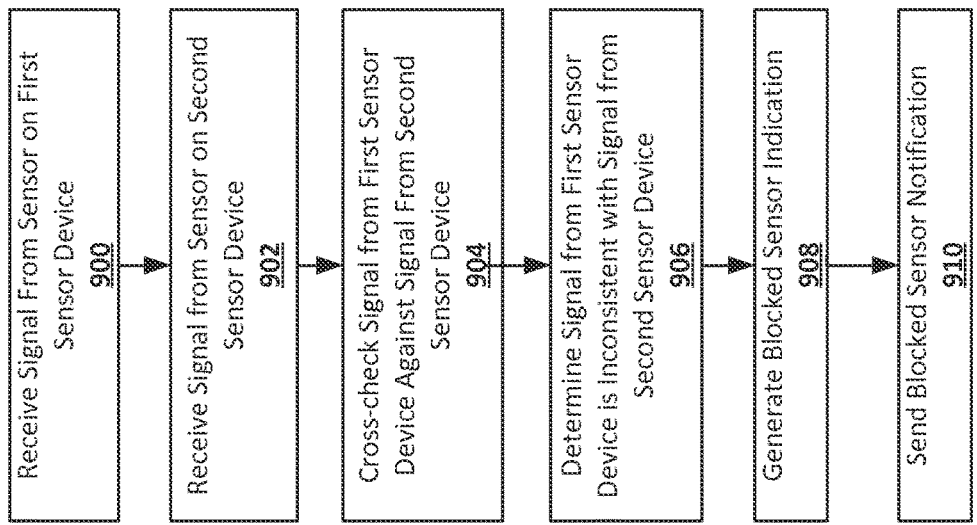
FIG. 9 shows an example of a process suitable for blocked sensor detection and notification according to an implementation of the disclosed subject matter.

FIG. 9 shows an example of a process suitable for blocked sensor detection and notification according to an implementation of the disclosed subject matter. At 900, a signal may be received from a sensor on a first sensor device. For example, the signal receiver 110 of the hub computing device 100 may receive a signal from the motion sensor 212 of the sensor device 210, which may be part of a smart home environment. The signal may be actively output by the motion sensor 212, or may be interpreted from a lack out active output from the motion sensor 212. The signal may indicate, for example, that the motion sensor 212 has not detected any motion. The signal may also include an identification of the motion sensor 212, either explicitly, or based on a correlation by the signal receiver 110.

At 902, a signal may be received from a sensor on a second sensor device. For example, the signal receiver 110 of the hub computing device 100 may receive a signal from the camera 224 of the sensor device 220. The sensor device 220 may be located in the same environment, for example, room, as the sensor device 210, so that signals from sensors on the sensor device 210 and the sensor device 220 may be correlated. The signal from the camera 224 may be a video signal that may be used, for example, for facial recognition of known occupants on the home.

At 904, the signal from the sensor of the first sensor device may be cross-checked against the signal from the sensor of the second sensor device. For example, the signal cross-checker 120 may check the signal received from the motion sensor 212 against the signal received from the camera 224.

At 906, it may be determined that the signal from the first sensor drive is inconsistent with the signal from the second sensor device. For example, the signal received from the motion sensor 212 may indicate that no motion has been detected. The signal received from video signal received from the camera 224 may include a face of an occupant of the home, recognized by, for example, facial recognition performed by the signal receiver 110. The signal from the motion sensor 212 may be determined to be inconsistent with the signal from the camera 224, as a person may need to be in the room in order for their face to be recorded up by the camera 224 and recognized, in which case the motion sensor 212 should have registered the motion of that person.

At 908, a blocked sensor indication may be generated. For example, the model checker 130 may have determined that the signal from the motion sensor 212 is inconsistent with the signal from the camera 224. This may indicate that the motion sensor 212 is blocked or otherwise producing anomalous output. A blocked sensor indication may be generated by the model checker 130 and sent to the signal receiver 110. The signal receiver 110 may degrade the confidence level of the motion sensor 212 based on the blocked sensor indication.

At 910, a blocked sensor notification may be sent. For example, the signal receiver 110, or other suitable component the hub computing device 100 may send a notification indicating that the motion sensor 212 is blocked to a user of the smart home environment. The notification may be sent to the user computing device 280, displayed on a display of the hub computing device 100 or other display connected to the smart home environment, transmitted through a speaker of the smart home environment, or sent in any other suitable manner. The notification may identify the motion sensor 212, so that the user may attempt to unblock or otherwise fix or replace the motion sensor 212.

FIG. 10 shows an example arrangement suitable for blocked sensor detection and notification according to an implementation of the disclosed subject matter. The signal receiver 110 may send blocked sensor notifications to a user of the security system in any suitable manner. For example, a blocked sensor notification may be sent to the display of the user computing device 280, a display 1020 of the hub computing device 100 or other computing device within the smart home environment, or to a speaker 1030 within the smart home environment. The blocked sensor notification may be sent any number of displays or speakers, which may be chosen, for example, based on their proximity to the user the blocked sensor notification is sent to. For example, if the user is currently an occupant of the environment and is near the speaker 1030, the speaker 1030 may be used to communicate the blocked sensor notification to the user. If the user is absent from the environment, the blocked sensor notification may be sent to the user computing device 280, which may be, for example, the user's smartphone. The blocked sensor notification may include, for example, a notification 1010, which may explain in written form or verbally which sensor of the security system has been determined to be blocked or producing anomalous output.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 11:
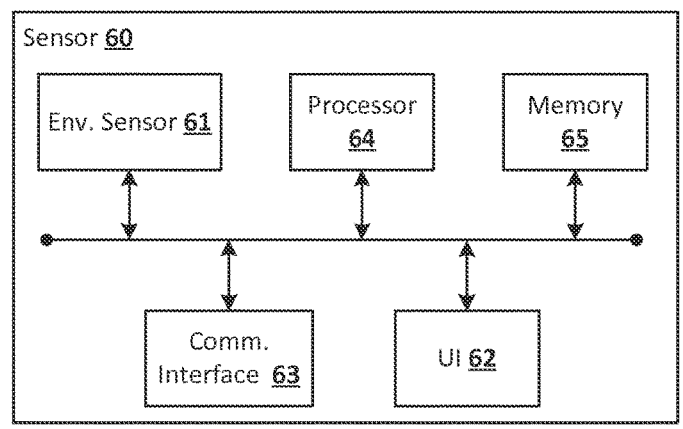
FIG. 11 shows a computing device according to an embodiment of the disclosed subject matter.

A sensor may include hardware in addition to the specific physical sensor that obtains information about the environment. FIG. 11 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 12:
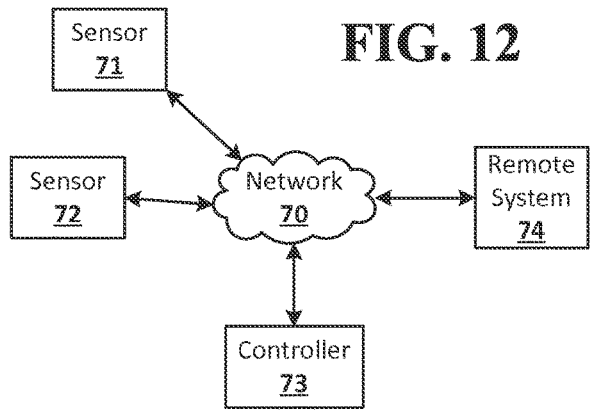
FIG. 12 shows a system according to an embodiment of the disclosed subject matter.

FIG. 12 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 100, the motion sensors 212 and 222, the camera 224, the microphone 226, and the entryway sensor 242, may be examples of a controller 73 and sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 12 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 12 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more multi-sensing, network-connected entryway interface devices (e.g., "smart doorbells"). The smart hazard detectors, smart thermostats, and smart doorbells may be the sensors 71, 72 shown in FIG. 12.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 12, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 12, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 12 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 12. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 12 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 12 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment e.g., as illustrated as sensors 71, 72 of FIG. 12 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

Figure 13:
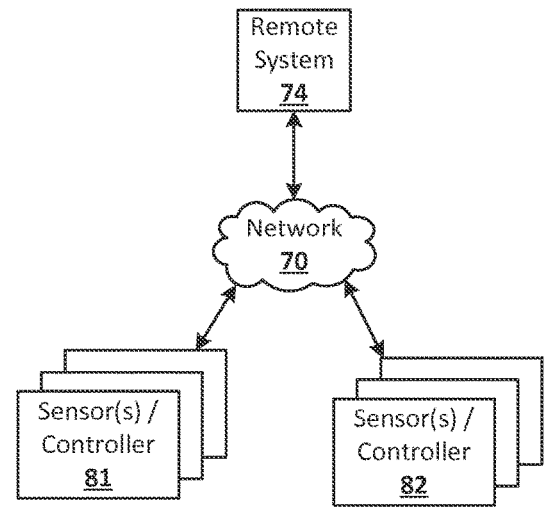
FIG. 13 shows a system according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 13 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 14:
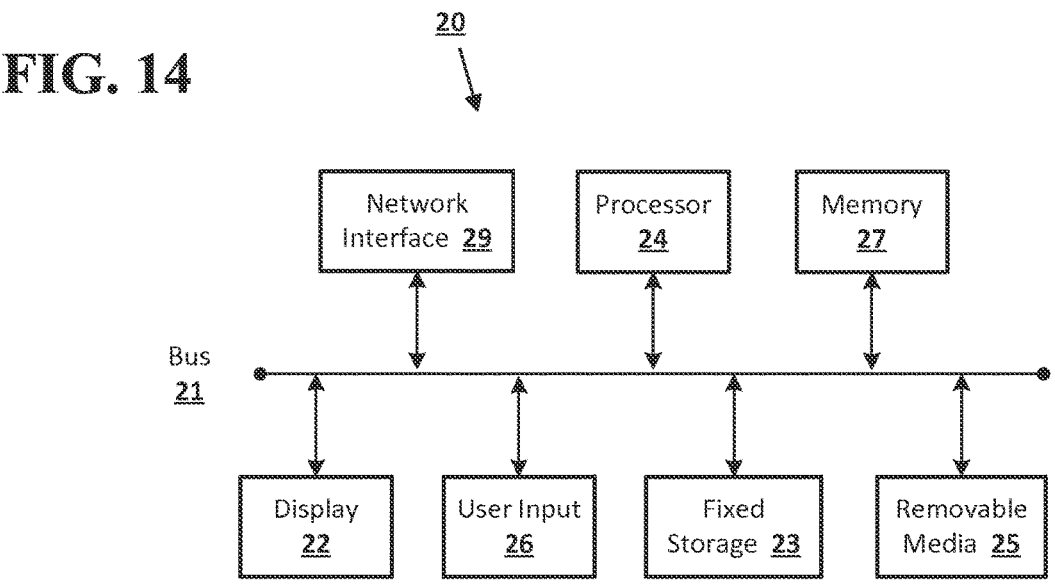
FIG. 14 shows a computer according to an embodiment of the disclosed subject matter.

Embodiments of the presently disclosed subject matter may be implemented in and used with a variety of computing devices. FIG. 14 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 15:
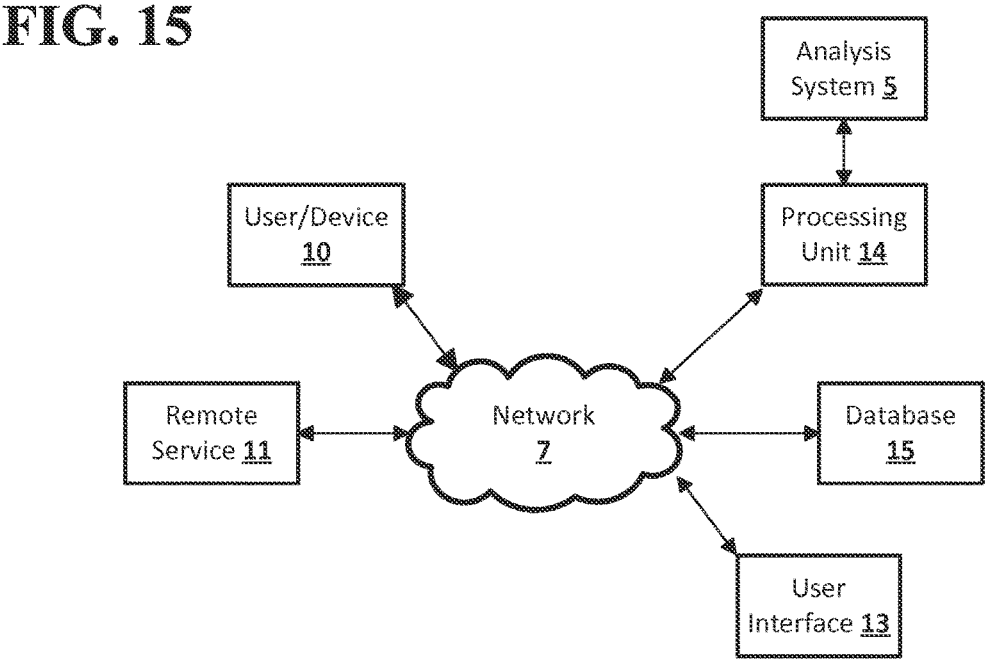
FIG. 15 shows a network configuration according to an embodiment of the disclosed subject matter.

FIG. 15 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:
1. A computer-implemented method performed by a data processing apparatus, the method comprising:
receiving, at a signal receiver of a computing device, a signal from a motion sensor disposed at a location in an environment;

determining, by the computing device, that the motion sensor is producing anomalous output based on
  checking, by a model checker of the computing device, the signal from the motion sensor against a slow temporal model for the motion sensor, wherein the slow temporal model for the motion sensor is one of a statistical, probabilistic, or machine learning based model for the signals from the motion sensor based on signals previously received from the motion sensor over a period of time, wherein the checking the signal from the motion sensor against the slow temporal model for the motion sensor further comprises:
    receiving, by the model checker of the computing device, the slow temporal model for the motion sensor from a storage device,
    determining, by the model checker of the computing device, that the signal from the motion sensor is inconsistent over a threshold period of time with a signal that the slow temporal model indicates is expected from the motion sensor in the situation in which the signal from the motion sensor was generated, and
    generating, by the model checker of the computing device, an indication that the motion sensor is producing anomalous output based on the determining that the signal from the motion sensor is inconsistent with the signal that the slow temporal model indicates is expected from the motion sensor in the situation in which the signal from the motion sensor was generated;
and in response to the indication that the motion sensor is producing anomalous output,
  degrading, by the computing device, a confidence level in the motion sensor when signals from the motion sensor are used by the computing device to determine a status of the environment.

2. The computer-implemented method of claim 1, further comprising determining that the motion sensor is producing anomalous output further based on checking the signal from the motion sensor against a signal from a second sensor on a same sensor device as the motion sensor, wherein the checking the signal from the motion sensor against the signal from the second sensor on the same sensor device as the motion sensor further comprises:
  receiving the signal from the second sensor on the same sensor device as the motion sensor;
  determining that the signal from the motion sensor is inconsistent with the signal from the second sensor; and
  generating the indication that the motion sensor is producing anomalous output.

3. The computer-implemented method of claim 1, further comprising determining that the motion sensor is producing anomalous output based on checking the signal from the motion sensor against one or more signals from one or more sensors on one or more additional sensor devices, wherein the checking the signal from the motion sensor against the one or more signals from the one or more sensors on the one or more additional sensor devices further comprises:
  receiving the one or more signals from the one or more sensors on the one or more additional sensor devices;
  determining that the signal from the motion sensor is inconsistent with at least one of the one or more signals from the one or more sensors;
  determining that the one or more signals from the one or more sensors are consistent with each other; and
  generating the indication that the motion sensor is producing anomalous output.

4. The computer-implemented method of claim 3, wherein determining that the signal from the motion sensor is inconsistent with at least one of the one or more signals from the one or more sensors further comprises:
  determining that the signal from the motion sensor indicates no motion is detected in an environment monitored by the motion sensor; and
  determining that the at least one of the one or more signals indicates the presence of a moving person within the environment.

5. The computer-implemented method of claim 4, wherein the environment is a room in a structure.

6. The computer-implemented method of claim 1, further comprising determining that there are no conditions causing the signal from the motion sensor to be inconsistent with the signal that the slow temporal model indicates is expected, before generating the indication that the motion sensor is producing anomalous output.

7. The computer-implemented method of claim 6, wherein one of the conditions causing the signal from the motion sensor to be inconsistent with the signal that the slow temporal model indicates is expected comprises a security system comprising the motion sensor being set to an away mode or a vacation mode.

8. The computer-implemented method of claim 1, wherein the motion sensor is one of a passive infrared sensor, a low power motion sensor, and a camera.

9. The computer-implemented method of claim 1, wherein the notification is a blocked sensor notification indicating that the motion sensor is obstructed.

10. The computer-implemented method of claim 1, wherein the notification is sent to one or more of: a computing device associated with a user of a smart home environment, a display within the smart home environment, and a speaker system within the smart home environment.

11. A computer-implemented system for blocked sensor detection and notification comprising:
  a motion sensor of a smart home environment, the motion sensor disposed at a location in the smart home environment and adapted to monitor an aspect of an environment and generate a signal;
  a storage comprising one or more slow temporal models, at least one of the slow temporal models associated with the motion sensor, wherein the at least one of the slow temporal models that is associated with the motion sensor is one of a statistical, probabilistic, or machine learning based model for the signals from the motion sensor based on signals previously received from the motion sensor over a period of time; and
  a hub computing device adapted to receive the signal from the motion sensor with a signal receiver of the hub computing device, determine that the motion sensor is producing anomalous output based on checking the signal from the motion sensor against the slow temporal model associated with the motion sensor with a model checker of the hub computing device by receiving the slow temporal model for the motion sensor from the storage with the model checker of the hub computing device, determining with the model checker of the hub computing device that the signal from the motion sensor is inconsistent over a threshold period of time with a signal that the slow temporal model indicates is expected from the motion sensor in the situation in which the signal from the motion sensor was generated, and generating with the model checker of the hub computing device an indication that the motion sensor is producing anomalous output based on the determining that the signal from the motion sensor is inconsistent with the signal that the slow temporal model indicates is expected from the motion sensor in the situation in which the signal from the motion sensor was generated, and degrade a confidence level in the motion sensor when signals from the motion sensor are used by the hub computing device to determine a status of the environment.

12. The computer-implemented system of claim 11, wherein the hub computing device is further adapted to determine that the motion sensor is producing anomalous further based on checking the signal from the motion sensor against a signal from a second sensor on a same sensor device as the motion sensor by receiving the signal from the second sensor on the same sensor device as the motion sensor, determining that the signal from the motion sensor is inconsistent with the signal from the second sensor, and generating the indication that the motion sensor is producing anomalous output.

13. The computer-implemented system of claim 11, wherein the hub computing device is further adapted to determine that the motion sensor is producing anomalous further based on checking the signal from the motion sensor against one or more signals from one or more sensors on one or more additional sensor devices by receiving the one or more signals from the one or more sensors on the one or more additional sensor devices, determining that the signal from the motion sensor is inconsistent with at least one of the one or more signals from the one or more sensors, determining that the one or more signals from the one or more sensors are consistent with each other, and generating the indication that the motion sensor is producing anomalous output.

14. The computer-implemented system of claim 11, wherein the hub computing device is further adapted to determine that there are no conditions causing the signal from the motion sensor to be inconsistent with the signal that the slow temporal model indicates is expected, before generating the indication that the motion sensor is producing anomalous output.

15. The computer-implemented system of claim 14, wherein one of the conditions causing the signal from the motion sensor to be inconsistent with the signal that the slow temporal model indicates is expected comprises a security system comprising the motion sensor being set to an away mode or a vacation mode.

16. The computer-implemented system of claim 11, wherein the hub computing device is adapted to determine that the signal from the motion sensor is inconsistent with at least one of the one or more signals from the one or more sensors further comprises by determining that the signal from the motion sensor indicates no motion is detected in an environment monitored by the motion sensor and determining that the at least one of the one or more signals indicates the presence of a moving person within the environment.

17. The computer-implemented system of claim 11, wherein the motion sensor is one of motion sensor, a passive infrared sensor, a low power motion sensor, and a camera.

18. The computer-implemented system of claim 11, wherein the notification is a blocked sensor notification indicating that the motion sensor is obstructed.

19. The computer-implemented system of claim 11, wherein the hub computing device is further adapted to send the notification to one or more of: a computing device associated with a user of a smart home environment, a display within the smart home environment, and a speaker system within the smart home environment.

20. A system comprising: one or more computers and one or more storage devices storing instructions which are operable, when executed by the one or more computers, to cause the one or more computers to perform operations comprising:
receiving, at a signal receiver of a computing device, a signal from a motion sensor disposed at a location in an environment;
determining, by the computing device, that the motion sensor is producing anomalous output based on
checking, by a model checker of the computing device, the signal from the motion sensor against a slow temporal model for the motion sensor, wherein the slow temporal model for the motion sensor is one of a statistical, probabilistic, or machine learning based model for the signals from the motion sensor based on signals previously received from the motion sensor over a period of time, wherein the checking the signal from the motion sensor against the slow temporal model for the motion sensor further comprises:
receiving, by the model checker of the computing device, the slow temporal model for the motion sensor from a storage device,
determining, by the model checker of the computing device, that the signal from the motion sensor is inconsistent with a signal that the slow temporal model indicates is expected from the motion sensor in the situation in which the signal from the motion sensor was generated, and
generating, by the model checker of the computing device, an indication that the motion sensor is producing anomalous output based on the determining that the signal from the motion sensor is inconsistent over a threshold period of time with the signal that the slow temporal model indicates is expected from the motion sensor in the situation in which the signal from the motion sensor was generated;
and in response to the indication that the motion sensor is producing anomalous output,
degrading, by the computing device, a confidence level in the motion sensor when signals from the motion sensor are used by the computing device to determine a status of the environment.

21. The system of claim 20, wherein the instructions further cause the one or more computers to perform operations comprising:
receiving a signal from a second sensor on a same sensor device as the motion sensor;
determining that the signal from the motion sensor is inconsistent with the signal from the second sensor; and
generating the indication that the motion sensor is producing anomalous output.

22. The system of claim 20, wherein the instructions further cause the one or more computers to perform operations comprising:
receiving one or more signals from one or more sensors on one or more additional sensor devices;
determining that the signal from the motion sensor is inconsistent with at least one of the one or more signals from the one or more sensors;
determining that the one or more signals from the one or more sensors are consistent with each other; and generating the indication that the motion sensor is producing anomalous output.

\* \* \* \* \*